Feb. 8, 1938. T. F. BIRMINGHAM 2,107,435
WELDING FINS TO TUBES
Filed Aug. 24, 1935

INVENTOR
THOMAS F. BIRMINGHAM
BY O. V. Thiele
ATTORNEY

UNITED STATES PATENT OFFICE 2,107,435

WELDING FINS TO TUBES

Thomas F. Birmingham, Hammond, Ind., assignor to The Superheater Company, New York, N. Y.

Application August 24, 1935, Serial No. 37,690

3 Claims. (Cl. 29—157.3)

This invention relates to welding processes and particularly to a process of welding a fin or fins along a fluid circulating tube.

Various types of heat transfer apparatus include fluid circulating tubes having longitudinal fins that constitute extensions of the heat transferring surfaces of the tubes. In many instances the fins are attached to the tubes by welding and it is important to obtain a good bond between the tube and fin at the weld in order to provide for efficient heat conduction between the tube and the fin or fins.

When a fin is welded along one side of a tube the latter wraps toward the fin, apparently because the fin and the weld material contract, during cooling, at a more rapid rate than the tube and thus exert forces of sufficient magnitude to bow the tube toward the weld. Such tubes also warp when fins are welded simultaneously along opposite sides of the tube although, theoretically, no distortion should occur since the forces exerted should be the same; that is, assuming the fins to be accurately located diametrically of the tube and the welding speed, current, etc., to be the same for both fins. However, it is not generally practicable to maintain these conditions and hence distortion occurs. Sometimes part of the distortion is toward one fin and part toward the other with the result that the finished tube is wavy, but generally the tendency is for the two ends of the tube to rise, bowing the tube in the vertical direction, or 90 deg. with respect to the welds, so that the flat surfaces of the fins are bowed rather than their edges.

One object of the present invention is to provide a good bond between the surface of a fluid circulating tube and a fin welded thereto.

Another object is to eliminate warping of the tube as a consequence of the welding operation.

Figure 1:
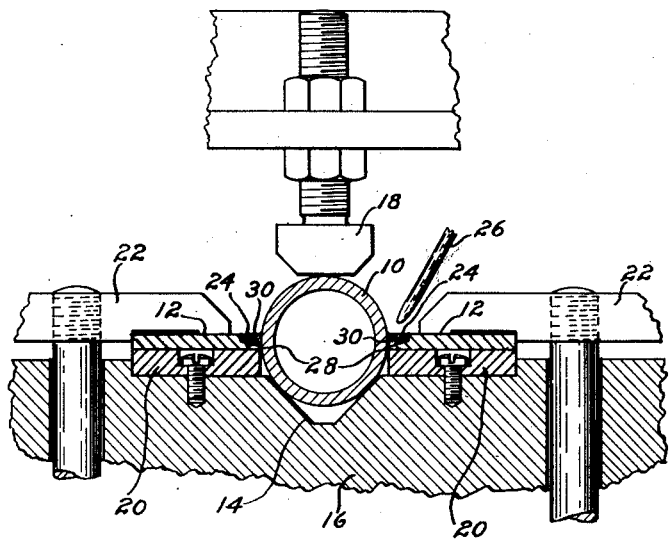
Figure 2:
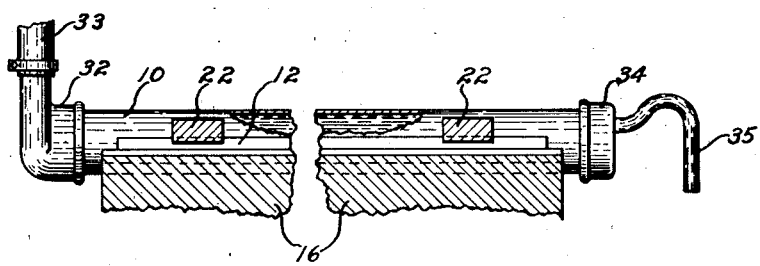

Other features and advantages of the invention will become apparent upon consideration of the following detailed description of an illustrative embodiment of the invention and the appended claims when read in conjunction with the accompanying drawing in which:

Figure 1 is a transverse sectional view of part of a welding apparatus and illustrates the manner of welding a fin to a tube to secure a good bond therebetween in accordance with the invention; and Figure 2 is a broken side elevational view, partly in section, corresponding to Figure 1 and illustrates the method of preventing warping of the tube.

Referring to the drawing, the numeral 10 designates a metallic tube to which metallic fins 12 are to be welded. The tube is mounted in a trough 14 extending longitudinally of a welding fixture 16 against which it is held during the welding operation by clamps 18. The fins 12 are held in position against backing strips 20, which are preferably of copper, and also held in contact with the surface of tube 10 by clamps 22.

As is shown in Figure 1, the fin 12 is bevelled at 24 along the inner edge of its upper side so that a welding groove is provided between the fin and tube into which welding material is deposited from an electrode 26. The thickness of the edge 28 of the fin that contacts tube 10 is substantially less than the thickness of the fin proper so that the welding material may penetrate between the thin fin edge and tube to form a weld 30 which is as deep or thick as the thickness of the fin. For example, with a fin that is one inch thick, the inner edge would be bevelled so that the edge portion 28 would be one quarter inch, or somewhat less, in thickness. During the welding operation the copper backing strip 20 conducts heat away from the fin 12 and also acts to prevent the weld burning completely through the fin as it is laid.

The bottom edge of the fin pulls up tightly against the tube as the weld is laid on the bevelled upper side of the fin. This is due to the fact that because the fin is held from moving outward by clamps 22 the expansion of the fin resulting from heat generated in welding pushes the thin heated edge of the fin into the tube through the welded metal. As a result, the lower edge of the fin has the appearance of being bonded to the tube. This together with the production of a weld substantially equal in thickness to the fin, without welding along both sides of the fin, provides for good heat conduction between the fin and tube.

During the welding operation a cooling medium such as water is caused to flow through the tube, the water being admitted through an inlet connection 32 and discharged through an outlet connection 34. The water is passed through the tube without substantial pressure and as it is deemed preferable to maintain the tube filled with water the outlet is restricted. For this purpose the outlet pipe 35 is of smaller diameter than the inlet pipe 33 and is formed with a goose neck portion.

The water flowing through the tube during welding of a fin or fins thereto causes the tube wall to be maintained sufficiently cooled as to prevent distortion. Since the heat generated in the welding operation is localized in the weld which is cooled almost a soon as it is laid, the temperature of the tube wall and fin is not raised to an extent sufficient to produce material expansion thereof. Consequently, the contraction upon cooling after welding is slight with the result that distortion of the tube is substantially eliminated.

It has been noted in practising the invention that the circulation of water through the tube also results in improved welding conditions. The uniform consistency and conductivity of the mass of water in the tube by providing a better electrical grounding eliminate fluctuations that occur in the indicating instruments and in the laying of the weld when welding by other processes. It has also been found possible to weld at a rate several times greater than when practising other methods.

What I claim is:

1. The method of welding a fin on a tube and preventing consequential distortion of the fin and tube due to a contraction of the fin and tube at unequal rates upon cooling which comprises providing a welding groove between the fin and tube, depositing welding material in the groove, and flowing a cooling medium through the tube in contact with the interior thereof immediately adjacent the weld to cool the tube and the weld as the latter is laid.

2. The method of welding a fin on a tube and preventing consequential distortion of the fin and tube due to contraction of the fin and tube at unequal rates upon cooling which comprises providing a welding groove between the fin and tube, depositing welding material in the groove, and maintaining the tube substantially filled with a cooling medium circulating therethrough and contacting the interior thereof immediately adjacent the weld to cool the latter and tube as the weld is laid.

3. The method of welding a fin on a tube and preventing consequential distortion of the fin and tube due to contraction of the fin and tube at unequal rates upon cooling which comprises providing a welding groove between the fin and tube, depositing welding material in the groove, and cooling the tube and weld as the latter is laid by continuously flowing water through the tube in contact with interior thereof immediately adjacent the weld.

THOMAS F. BIRMINGHAM.